Aug. 9, 1949.     C. A. MIZEN     2,478,300
RADIO DIRECTION INDICATOR
Filed April 2, 1946
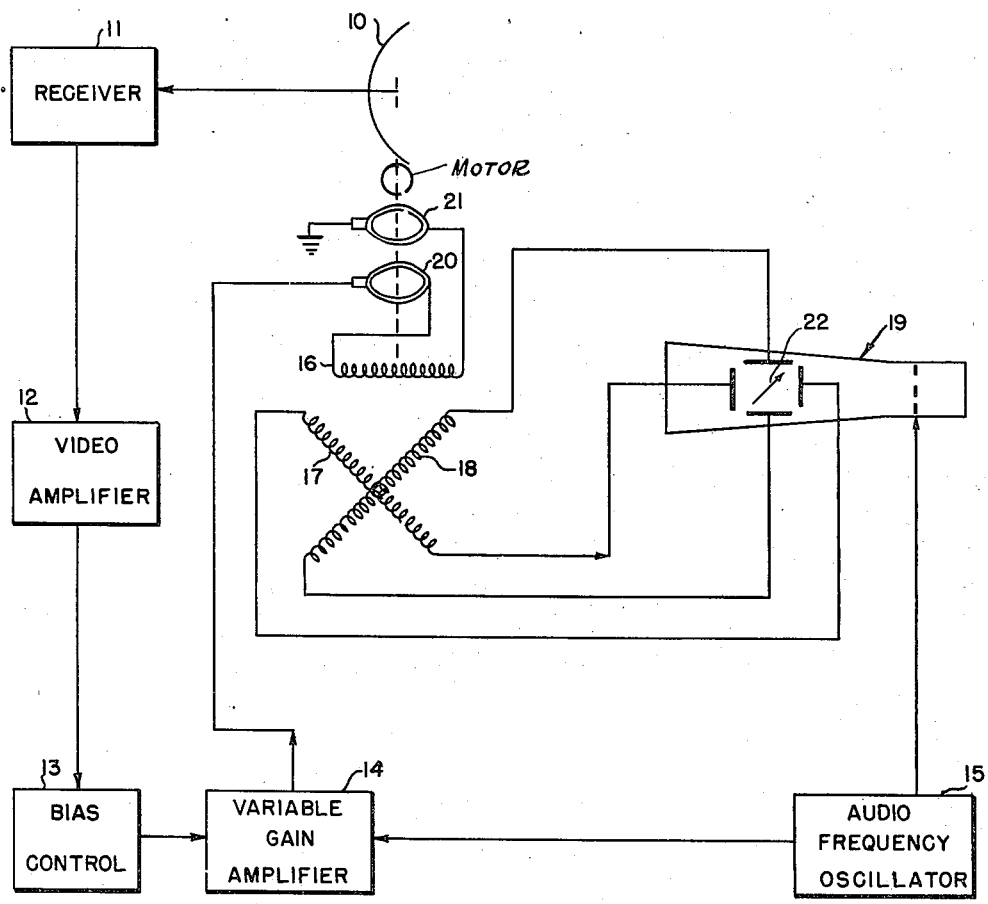
INVENTOR.
CARLTON A. MIZEN
BY
*William D. Hall*
ATTORNEY Patented Aug. 9, 1949

2,478,300

UNITED STATES PATENT OFFICE 2,478,300

RADIO DIRECTION INDICATOR

Carlton A. Mizen, Cambridge, Mass., assignor to the United States of America as represented by the Secretary of War Application April 2, 1946, Serial No. 658,940

3 Claims. (Cl. 343—118)

1

This invention relates generally to electrical apparatus and more particularly to a direction finder system indicator.

The usual direction finder system which uses a rotatable directional receiving antenna in conjunction with a cathode ray oscilloscope type of presentation contains a multiplicity of Selsyns, synchronous motors or in lieu thereof, a chain of synchronized parts such as voltage dividing condensers, rotating deflection yokes for electromagnetic type cathode ray tubes and other similar physically rotating parts.

The inherent disadvantages of the use of the abovementioned physically rotatable devices for obtaining a cathode ray oscilloscope presentation are obvious to those familiar with direction finder systems. The elimination of physically rotatable parts with their associated frictional losses, hunting for synchronism and mechanical resonances would substantially increase the accuracy and dependability of a direction finder system.

It is an object of the present invention to reduce to a minimum the required number of mechanically rotating parts of a direction finder system.

It is another object to provide a simple, dependable and light weight indicator system for direction finder apparatus.

It is also an object to substantially increase the accuracy of the presentation system of direction finder apparatus.

An indicator system for use with direction finder apparatus embodying the principles of this invention, employs, in addition to the usual basic components, an electrical resolving goniometer whose rotor winding physically rotates in synchronism with a directional receiving antenna and is energized by an audio frequency sine wave voltage whose amplitude varies with the strength of a received signal. Two stator windings of the goniometer are physically spaced with respect to each other to provide two sine wave voltages displaced 90 degrees from each other for application to the deflection plates of a conventional electrostatic type cathode ray tube (hereinafter referred to as a CRT) for obtaining a rotating sweep. A variable gain amplifier whose instantaneous gain is determined by the magnitude of the received signal, applies the variable amplitude sine wave audio frequency voltage to the rotor winding of the goniometer.

Other objects, features and advantages of this invention will suggest themselves to those skilled in the art and will become apparent from the following description of the invention taken in

2 connection with the single figure of the accompanying drawing which is a direction finder system shown partially in schematic and partially by a block diagram.

Referring now to the drawing, a rotatable directional antenna 10 is electrically connected to a receiver 11. A video amplifier 12 connects receiver 11 to a bias control circuit 13. Bias control circuit 13 is connected to the variable gain amplifier 14 in such a manner that the potential applied from the bias control circuit controls the gain of the amplifier. The amplifier 14 is in turn connected to audio frequency oscillator 15. An electrical resolving goniometer has a rotor winding 16 mechanically linked to rotate in synchronism with antenna 10 and two stator windings 17 and 18 respectively, oriented in space 90 degrees with respect to each other. Stator winding 17 is connected to the horizontal deflection plates of CRT 19 and stator winding 18 is connected to the vertical deflection plates of CRT 19.

The directional antenna is mechanically connected to rotor coil 16 and slip rings 20 and 21. All are synchronously driven by a motor, indicated in the drawing.

The output of variable gain amplifier 14 is electrically connected to the goniometer rotor winding 16 by means of slip-rings 20 and 21.

The purpose of the circuit is to provide a CRT presentation showing simultaneously the direction of a rotating antenna and the strength of the received signal.

To provide such a presentation, goniometer rotor winding 16 is energized by a sinusoidal audio frequency voltage which originates in audio frequency oscillator 15. Voltages are induced in stator windings 17 and 18 due to the excitation of rotor 16 and these induced voltages in the stator windings are applied to the deflection plates of CRT 19.

At a given instant, for the static conditions as shown in the drawing, these two voltages from stator windings 17 and 18 produce a resultant electrostatic field in CRT 19 whose direction is as shown by imaginary arrow 22 on the screen of CRT 19. One half of an audio frequency cycle (of audio frequency oscillator 15) later, the direction of arrow 22 will reverse.

It is obvious that as rotor winding 16 rotates in synchronism with antenna 10, this resultant field shown by the vector 22 will also rotate about the screen of CRT 19. Thus a sweep has been provided which rotates in synchronism with antenna 10.

To attain the objects of this invention, it is necessary to modify the abovementioned sweep trace so that a radial deflection will be provided, whose magnitude is proportional to the strength of a received signal. This is accomplished by varying the magnitude of the goniometer rotor winding 16 excitation voltage in proportion to the strength of a received signal.

Bias control 13 rectifies video signals and applies the resultant positive potential as a bias voltage to a grid of a vacuum tube in variable gain amplifier 14, thereby varying the amplitude of the audio frequency sine wave voltage output from amplifier 14. Consequently the magnitude of the sine wave output voltage from amplifier 14, which energizes rotor 16, varies in amplitude in proportion to the magnitude of the received signal, and therefore the voltages applied to the deflection plates of CRT 19, by stator windings 17 and 18, vary in a similar manner. Thus there is presented on the screen of CRT 19, a pattern proportional to the strength of a received signal and disposed about the screen of CRT 19 at an angle corresponding to the angular position of anenna 10.

A sine wave voltage from audio frequency oscillator 15 is also connected to the intensity control grid of CRT 19 for blanking purposes. This blanking feature is necessary because a complete audio frequency cycle of voltage applied to the deflection plates of CRT 19 would normally cause the luminous spot to oscillate diametrically across the screen and thus give it a bidirectional presentation. By blanking out each odd half cycle, the CRT presentation is made apparently radial and has unidirectional sense.

While there has been described what is at present considered to be the preferred embodiment of this invention, it will be obvious to those skilled in the art that various changes and modifications may be made therein without departing from the scope of the invention.

The invention claimed is:

1. A direction finder oscilloscope system for indicating the direction and strength of a received signal including an electrostatic deflection type cathode ray tube, having deflection plates in quadrature and at least one control grid, a directional receiving antenna, an audio frequency oscillator whose output is connected to the control grid of said cathode ray tube for blanking said cathode ray tube each odd half cycle, a variable gain amplifier which amplifies audio frequency voltages from said oscillator, a bias control circuit connected to said variable gain amplifier for providing a bias voltage whose amplitude is proportional to the strength of said received signal, an electrical resolving goniometer with a rotor winding and two stator windings which are displaced in space 90 degrees from each other with said rotor winding mechanically linked to rotate in synchronism with said directional receiving antenna, and electrically connected to the output of said variable gain amplifier and with said stator windings electrically connected to the deflection plates of said cathode ray tube whereby a radial pattern is presented on the screen of said cathode ray tube with a magnitude proportional to the strength of the received signal at an angular position corresponding to the direction of the received signal source.

2. A direction finder oscilloscope system for indicating the direction and strength of a received signal, including a source of audio frequency sine wave voltage, a rotatable directional receiving antenna, a bias control circuit whose output is a positive potential of a magnitude proportional to the strength of said received signal, a variable gain amplifier electrically connected to said bias control circuit and to said source of audio frequency sine wave voltage so that its output voltage is an audio frequency voltage proportional to the strength of a received signal, an electrical resolving goniometer having a rotor winding and two stator windings with said rotor winding electrically energized by the output voltage of said variable gain amplifier and mechanically linked to rotate in synchronism with said rotatable directional receiving antenna, an electrostatic type cathode ray tube having a control grid and four deflection plates arranged in quadrature and electrically connected to said goniometer stator windings and with said control grid connected to said source of audio frequency sine wave voltage for blanking said cathode ray tube each odd half cycle whereby said cathode ray tube screen presentation in apparently radial and has unidirectional sense.

3. A direction finder oscilloscope system for indicating the strength and direction of a received signal including a directional receiving antenna, oscillator means for producing a sine wave audio frequency voltage, amplifying means connected to said oscillator means, means responsive to the strength of said received signal to control the gain of said amplifying means, goniometer means electrically connected to said amplifying means and mechanically connected to said receiving antenna so that the output voltages of said goniometer are products of the direction as well as the strength of said received signal and indicator means electrically connected to said goniometer means whereby said indicator shows both the direction and strength of said received signal.

CARLTON A. MIZEN.

REFERENCES CITED

The following references are of record in the file of this patent:

UNITED STATES PATENTS

| Number | Name | Date |
|---|---|---|
| 2,151,917 | Hyland | Mar. 28, 1939 |
| 2,380,929 | Ahier et al. | Aug. 7, 1945 |
| 2,388,262 | Ganiayre | Nov. 6, 1945 |
| 2,400,791 | Tolson | May 21, 1946 |
| 2,403,967 | Busignies | July 16, 1946 |
| 2,408,041 | Busignies | Sept. 24, 1946 |
| 2,409,456 | Tolson | Oct. 15, 1946 |

FOREIGN PATENTS

| Number | Country | Date |
|---|---|---|
| 635,793 | Germany | Sept. 28, 1936 |